US012633853B2

(12) United States Patent
Sun et al.

(10) Patent No.: US 12,633,853 B2
(45) Date of Patent: May 19, 2026

(54) METHODS AND SYSTEM FOR ELECTRIC MACHINE POSITION OFFSET ESTIMATION

(71) Applicant: Ford Global Technologies, LLC, Dearborn, MI (US)

(72) Inventors: Xuemei Sun, Canton, MI (US); Yang Xu, Canton, MI (US); David Michael Bevan, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 18/413,794

(22) Filed: Jan. 16, 2024

(65) Prior Publication Data

US 2025/0233538 A1     Jul. 17, 2025

(51) Int. Cl.
    *H02P 1/00*          (2006.01)
    *H02P 21/18*         (2016.01)
    *H02P 21/22*         (2016.01)
    *B60L 15/20*         (2006.01)
(52) U.S. Cl.
    CPC .............. *H02P 21/18* (2016.02); *H02P 21/22* (2016.02); *B60L 15/2045* (2013.01)

(58) Field of Classification Search
    CPC .......... H02P 21/18; H02P 21/06; H02P 21/22; H02P 21/141; H02P 23/14; H02P 27/06; H02P 21/14
    See application file for complete search history.

(56) References Cited

U.S. PATENT DOCUMENTS

| | | | |
|---|---|---|---|
| 10,498,207 B2 | 12/2019 | Rho et al. | |
| 11,718,184 B2 | 8/2023 | Hair et al. | |
| 2019/0176805 A1* | 6/2019 | Lim ...................... | B60W 20/15 |
| 2020/0144948 A1 | 5/2020 | Nishijima et al. | |
| 2021/0233538 A1* | 7/2021 | Takeshita ................ | G10L 17/06 |
| 2022/0329185 A1 | 10/2022 | Koikegami et al. | |

* cited by examiner

*Primary Examiner* — Karen Masih
(74) *Attorney, Agent, or Firm* — McCoy Russell LLP

(57)          ABSTRACT

Systems and methods for operating an electric drive system for an electric or hybrid vehicle is described. In one example, an angle error between an electric machine rotor reference position and an electric machine position sensor reference position is estimated when high voltage is present and when zero torque is commanded of the electric machine.

20 Claims, 4 Drawing Sheets

METHODS AND SYSTEM FOR ELECTRIC MACHINE POSITION OFFSET ESTIMATION

FIELD

The present description relates to methods and a system for operating an electric machine. The electric machine may include permanent magnets.

BACKGROUND AND SUMMARY

Electric vehicles and hybrid vehicles include an electric machine that operates as a motor to provide positive torque to a driveline. The electric machine may be a permanent magnet machine that includes a rotor and a stator. The permanent magnets are included in the rotor and the rotor rotates in response to a rotating magnetic field that is generated by electrical current that flows through windings of the stator. Electric current flowing through the stator's coils may be decomposed into torque or quadrature current $(i_q)$ that generates torque in the electric machine and direct or flux current $(i_d)$ that tends to pull the rotor magnet in an outward direction. In order to efficiently operate the electric machine, it may be desirable to control quadrature current and flux current. To accurately control of quadrature current and flux current, it may be desirable to determine an angle, which may be referred to as "resolver offset," between an electric machine rotor flux position and an electric machine position sensor zero angle reference position. Further, it may be desirable to determine the error of such an angle, which may be referred to as "resolver offset error," for properly degradation reaction to prevent over or under delivering torque or vehicle speed. As such, an approach is provided herein whereby the angle error may be determined with little effect on vehicle operation.

The summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
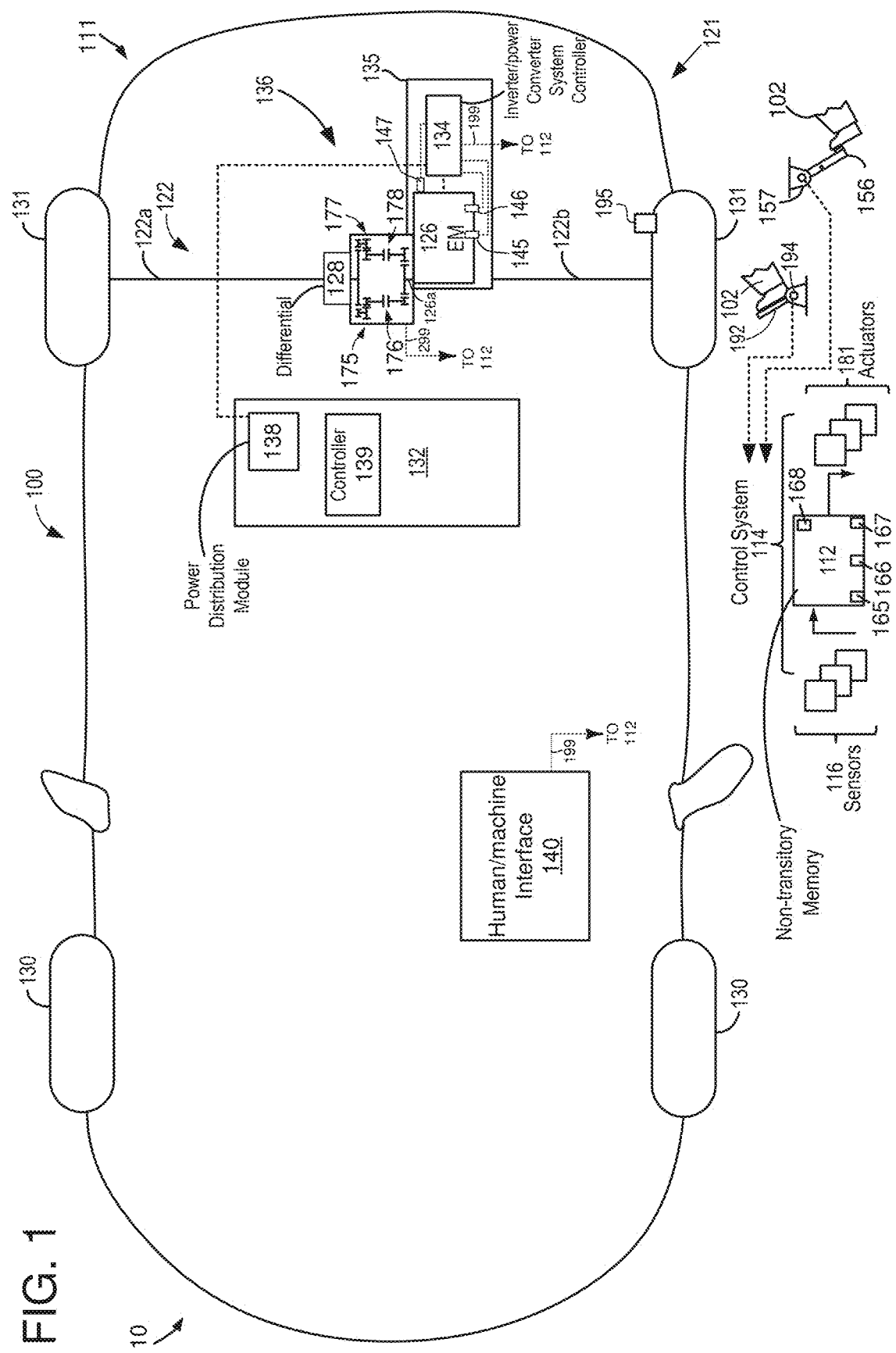
FIG. 1 is a schematic diagram of a vehicle that includes an electric machine for propulsion.
Figure 2:
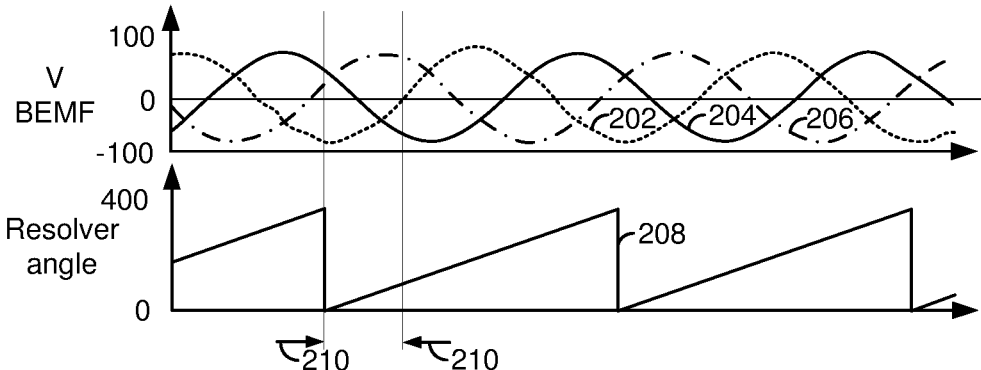
FIG. 2 shows plots that illustrate an angle between a rotor flux reference position and a rotor sensor zero angle reference position.
Figure 3:
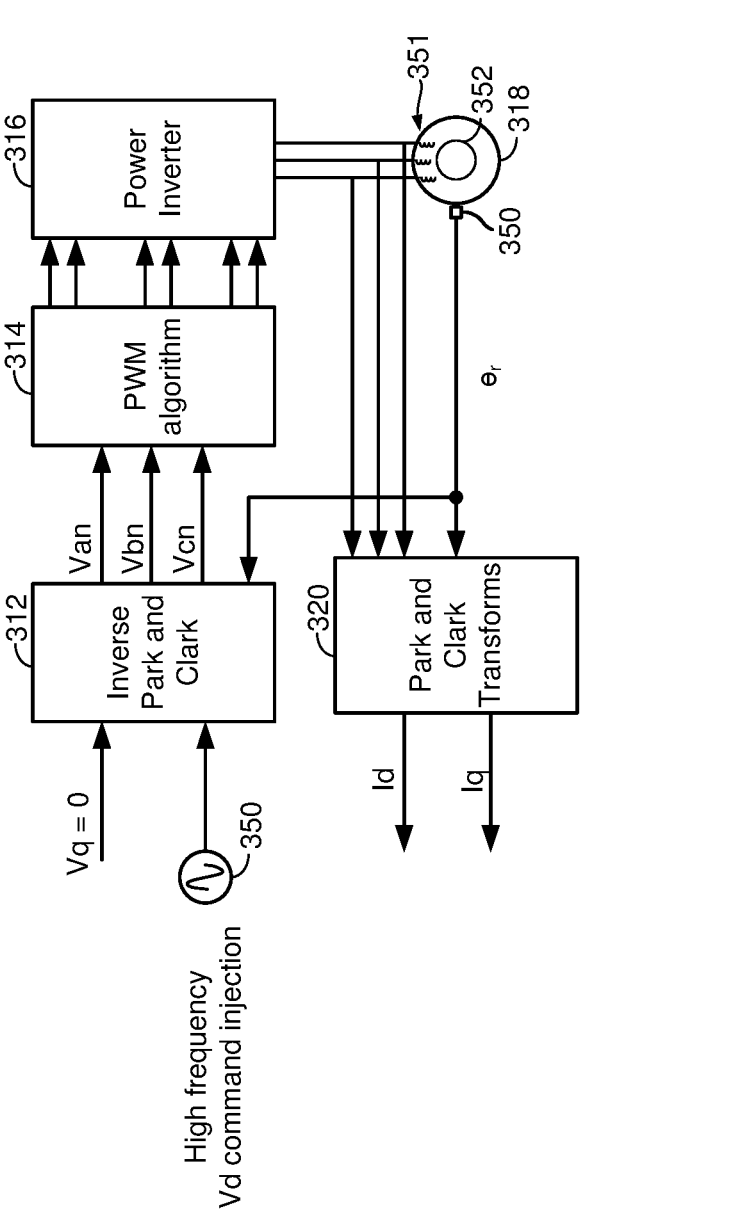
FIG. 3 is a block diagram for estimating an error of an angle between a rotor flux reference position and a rotor sensor zero angle reference position in a space vector pulse width modulation motor control system.
Figure 4:
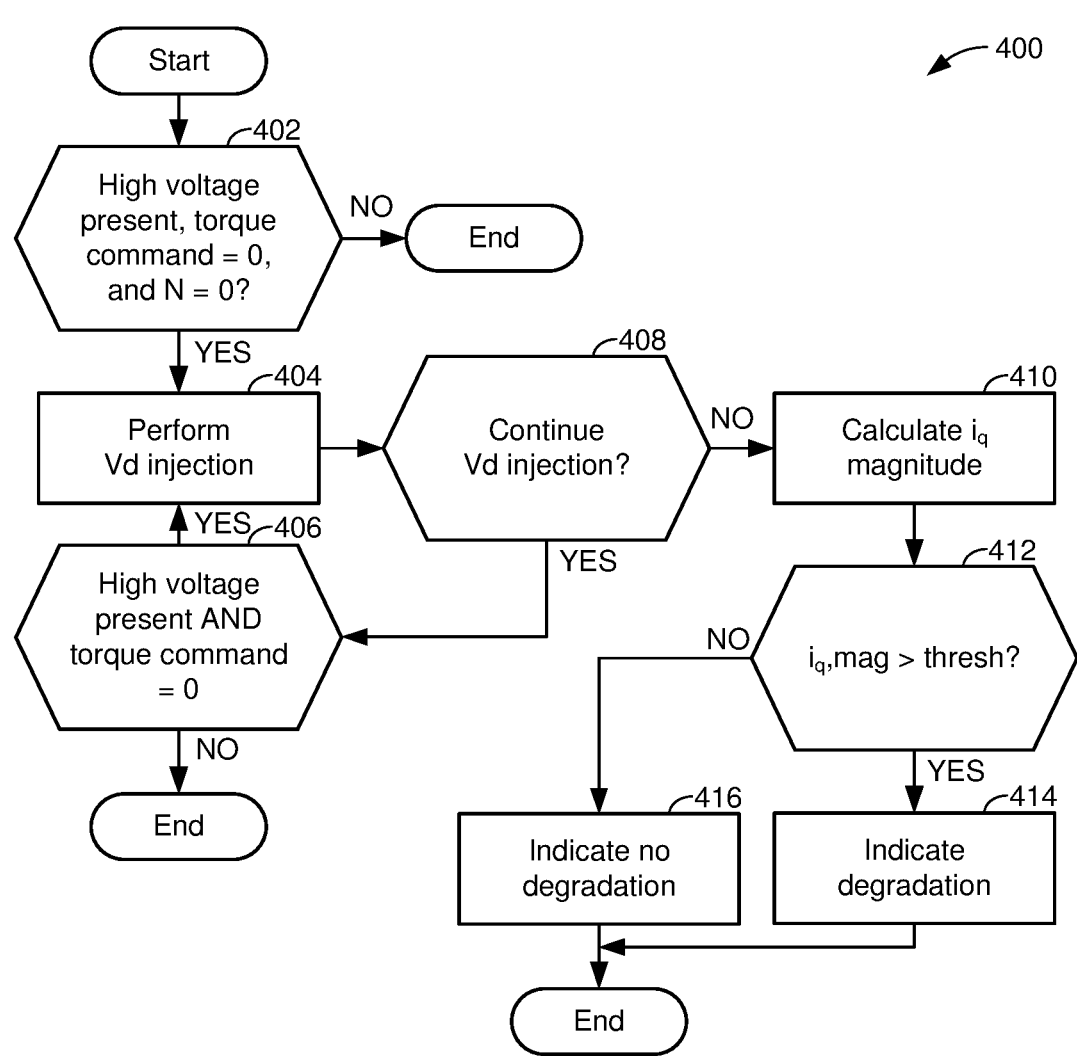
FIG. 4 shows a flowchart for estimating an error of an angle between the rotor flux reference position and the rotor sensor zero angle reference position.

The present description is related to detecting resolver offset error and an error of the angle between a rotor flux reference position and a rotor sensor zero angle reference position for an electric machine. The electric machine may be included in an electric drive system of a vehicle. The methods and systems described herein may permit a more accurate estimate of an angle between a rotor flux reference position and a rotor sensor zero angle reference position in case the rotor sensor zero reference position is changed, such as the motor stator together with resolver stator is moved for shrink fit motor design. In one example, the method includes injecting a signal into an electric drive system that includes a space vector pulse width modulated drive. The space vector pulse width modulated drive may receive a zero torque request while the error of the angle between the rotor flux reference position and the rotor sensor zero angle reference position is being estimated. A vehicle that includes a space vector pulse width modulated drive system and electric machine is shown in FIG. 1. A plot of an angle between an electric machine rotor flux reference position and a rotor sensor zero angle reference position is shown in FIG. 2. FIG. 3 shows a block diagram of a system for estimating an angle error for an angle between the electric machine rotor flux reference position and the rotor sensor zero angle reference position. FIG. 4 is a flowchart for estimating the angle error between the electric machine rotor flux reference position and the rotor sensor zero angle reference position.

An angle between a rotor flux reference position and a rotor sensor zero angle reference position may be determined during development of an electric or hybrid vehicle. This angle may be stored in memory of a controller and the angle may be a basis for adjusting operation of an electric machine so that the electric machine may operate more efficiently. However, it may be possible for a vehicle to have a different angle between the rotor flux reference position and the rotor sensor zero angle reference position than the development vehicle. The different angle may be the result of motor stator or resolver stator location moved for a shrink fit motor design, or wrong value was stored in the controller's memory caused by human error. If the electric machine control system does not compensate for the different angle, the vehicle having the different angle between the rotor flux reference position and the rotor sensor zero angle reference position may not operate as efficiently as may be desired, and the torque produced may be different from the requested torque.

The inventors herein have recognized the above-mentioned issues and have developed a method for operating an electric drive system, comprising: via a controller, supplying a time-varying flux voltage signal to an electric machine controller that generates a flux voltage signal; and estimating an angle error for an angle between an electric machine rotor flux reference position and an electric machine position sensor zero angle reference position responsive to the time-varying flux voltage via the controller.

By estimating an angle error via supplying a time-varying flux voltage signal to an electric machine controller that generates a flux voltage signal, it may be possible to determine a corrected angle between a reference rotor flux position and a rotor sensor zero angle reference position without having to use a torque sensor and without having to drive a vehicle.

The present description may provide several advantages. In particular, the approach may detect resolver offset error fault and further provide proper fault reaction action. The approach may provide more accurate estimates of an angle between a rotor flux reference position and a rotor sensor zero angle reference position. Additionally, the approach may be performed unobtrusively and without input from a vehicle user. Further, the approach may increase vehicle efficiency.

The above advantages and other advantages, and features of the present description will be readily apparent from the following Detailed Description when taken alone or in connection with the accompanying drawings.

FIG. 1 is a block diagram of a vehicle 121 including a powertrain or driveline 100. A front portion of vehicle 121 is indicated at 110 and a rear portion of vehicle 121 is indicated at 111. Vehicle propulsion system 100 includes electric machine 126. Electric machine 126 may consume or generate electrical power depending on its operating mode. Throughout FIG. 1, mechanical connections between various components are illustrated as solid lines, whereas electrical connections between various components are illustrated as dashed lines.

Vehicle propulsion system 100 includes a rear axle 122. In some examples, rear axle 122 may comprise two half shafts, for example first half shaft 122*a*, and second half shaft 122*b*. Vehicle propulsion system 100 further includes front wheels 130 and rear wheels 131. Rear wheels 131 may be driven via electric machine 126.

The rear axle 122 is coupled to electric machine 126. Rear drive unit 136 may transfer power from electric machine 126 to axle 122 resulting in rotation of rear wheels 131. Rear drive unit 136 may include a low gear 175 and a high gear 177 that are coupled to electric machine 126 via output shaft 126*a* of electric machine 126. Low gear 175 may be engaged via fully closing low gear clutch 176. High gear 177 may be engaged via fully closing high gear clutch 178. High gear clutch 178 and low gear clutch 176 may be opened and closed via commands received by rear drive unit 136 over controller area network (CAN) 199. Alternatively, high gear clutch 178 and low gear clutch 176 may be opened and closed via digital outputs or pulse widths provided via control system 114. Rear drive unit 136 may include differential 128 so that torque may be provided to first half shaft 122*a* and to second half shaft 122*b*. In some examples, an electrically controlled differential clutch (not shown) may be included in rear drive unit 136.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by electric machine 126. An inverter/power converter system controller 134 (ISC1) may convert alternating current generated by electric machine 126 to direct current for storage at the electric energy storage device 132 and vice versa. Electric drive system 135 includes electric machine 126 and inverter/power converter system controller 134. Electric energy storage device 132 may be a battery, capacitor, inductor, or other electric energy storage device. Electric power flowing into electric drive system 135 may be monitored via current sensor 145 and voltage sensor 146. Position and speed of electric machine 126 may be monitored via position sensor 147.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 114 may communicate with inverter/ power converter system controller 134, energy storage device 132, etc. Control system 114 may receive sensory feedback information from electric drive system 135 and energy storage device 132, etc. Further, control system 114 may send control signals to electric drive system 135 and energy storage device 132, etc., responsive to this sensory feedback. Control system 114 may receive an indication of an operator requested output of the vehicle propulsion system from a human operator 102, or an autonomous controller. For example, control system 114 may receive sensory feedback from pedal position sensor 194 which communicates with pedal 192. Pedal 192 may refer schematically to a driver demand pedal. Similarly, control system 114 may receive an indication of an operator requested vehicle caliper actuation via a human operator 102, or an autonomous controller. For example, control system 114 may receive sensory feedback from pedal position sensor 157 which communicates with caliper pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to electric energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 112). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 112 may comprise a portion of a control system 114. In some examples, controller 112 may be incorporated into electric drive system 135. Control system 114 is shown receiving information from a plurality of sensors 116 (various examples of which are described herein) and sending control signals to a plurality of actuators 181 (various examples of which are described herein). As one example, sensors 116 may include tire pressure sensor(s) (not shown), wheel speed sensor(s) 195, etc. In some examples, sensors associated with electric machine 126, wheel speed sensor 195, etc., may communicate information to controller 112, regarding various states of electric machine operation. Controller 112 includes non-transitory (e.g., read exclusive memory) 165, random access memory 166, digital inputs/ outputs 168, and a microcontroller 167. Controller 112 may receive input data and provide data to human/machine interface 140 via CAN 199.

Thus, the system of FIG. 1 provides for a system, comprising: an electric drive system including an inverter and an electric machine; and a controller including executable instructions stored in non-transitory memory that cause the controller to generate an estimated error of an angle between an electric machine rotor reference position and an electric machine position sensor reference position when a rotational speed of the electric machine is zero. In a first example, the system includes where the electric machine includes one or more permanent magnets. In a second example that may include the first example, the system further comprises commanding the electric drive system to generate a time-varying flux voltage signal while generating the estimate of offset angle error. In a third example that may include one or both of the first and second examples, the system further comprises additional executable instructions to generate a flux current and torque current from a time-varying flux voltage signal and zero quadrature voltage signal. In a fourth example that may include one or more of the first through third examples, the system further comprises additional executable instructions to generate a flux voltage from the time-varying flux voltage signal. In a fifth example that may include one or more of the first through fourth examples, the system further comprises additional executable instructions to determine a magnitude of a quadrature current, the quadrature current based on the time-varying flux voltage signal. In a sixth example that may include one or more of the first through fifth examples, the system further comprises additional executable instructions to operate the electric machine in response to the estimated error of the angle.

Referring now to FIG. 2, example plots that illustrates an angle between a rotor reference position and a rotor sensor reference position are shown. The first plot from the top of FIG. 2 shows back electro-motive force (BEMF) for each of an electric machine's phases versus time. The vertical axis represents BEMF voltage and the horizontal axis represents time. Time increases from the left side of the plot to the right side of the plot.

The second plot from the top of FIG. 2 represents rotor angle which is output of the rotor sensor (e.g., a resolver) versus time. The vertical axis represents rotor angle and the horizontal axis represents time. Time increases from the left side of the plot to the right side of the plot.

Dotted line 202 represents the BEMF voltage for the vw phase of the electric machine, solid line 204 represents the BEMF voltage for the wu phase of the electric machine, and dash-dot line 206 represents the BEMF voltage for the uv phase of the electric machine. The electric machine flux axis (BEMF) reference position is where the vw phase (BEMF) voltage crosses zero. The angular offset between the electric machine flux axis reference position and the rotor angular reference position is indicated between the arrows 210. The summation of the angular offset and the rotor sensor sensing angle position is the rotor flux angle and it may be applied to determine flux current $i_d$ and quadrature current $i_q$ as well as flux voltage $V_d$ and quadrature voltage $V_q$.

Referring now to FIG. 3, a block diagram of a controller 300 for determining angle error between an electric rotor flux reference position and a rotor sensor zero angle reference position is shown. The controller 300 provides pulse width modulation motor control for electric machine 126. The controller 300 may be comprised at least in part of executable instructions stored in non-transitory memory of controller 112. Controller 300 may also include hardware such as power transistors, inductors, capacitors, etc. In this example, electric machine 126 is a three phase electric machine that is supplied with electric power via inverter/power converter system controller 134. The amounts of electric current that are supplied in each of the three phases is input to block 320 where Park and Clark transforms convert the electric currents from each of the three phases into a measured quadrature current $i_q$ and a measured flux current $i_d$.

A zero torque voltage request is input to inverse Park and Clark transform 312. Also, a high frequency time-varying flux voltage supplied from source 350 is input to inverse Park and Clark transform 312. The quadrature voltage $V_q$ command and the time-varying flux voltage command $V_d$ are processed via an inverse Park and Clark transforms into phase voltages at block 312. The phase voltages Van, Vbn, and Vcn are input to block 314.

At block 314, the phase voltages are converted into phase pulses via space vector pulse width modulation. The pulses operate the transistors or switches in the inverter/power converter system controller 134. The inverter/power converter system controller 134 outputs voltages for each of the phase windings 351 of electric machine 126, which may cause rotor 352 to rotate. The position of rotor 352 is converted into an angle via rotor sensor 350 and the angle is supplied to blocks 312 and 320 for the inverse Park transform and the Park and Clark transforms.

Thus, a time-varying flux voltage may be injected to a controller and the controller may determine a quadrature current $i_q$ as detailed in the method of FIG. 4. Further, the controller may estimate an angle error or offset for compensating electric machine operation.

Referring to FIG. 4, a flowchart of a method for estimating an angle error for controlling an electric machine is shown. The method of FIG. 4 may be at least partially implemented as executable instructions stored in controller memory in the system of FIGS. 1 and 3. Further, the method of FIG. 4 may include actions taken in the physical world to transform operating states of the system of FIGS. 1 and 3. In addition, in some examples, the method of FIG. 4 may be distributed amongst several controllers where each controller performs a portion of the method.

At 402, method 400 checks the preconditions for Vd-injection. It judges whether or not a high voltage is present at the invertor/power converter for the electric machine. The high voltage may be a voltage output of a traction battery. The high voltage may be present at the inverter/power converter when the vehicle is activated. Method 400 may also judge whether or not a torque command for the electric machine is zero or substantially zero (e.g., within 5 Nm of zero Nm). Further, method 400 may also judge whether or not a rotational speed of the electric machine is zero or substantially zero (e.g., less than 5 revolutions/minute). If method 400 judges that the high voltage is present, the torque request for the electric machine is zero, and the electric machine rotational speed is zero, the answer is yes and method 400 proceeds to 404. Otherwise, the answer is no and method 400 proceeds to exit.

At 404, method 400 injects or supplies a flux voltage command signal to an electric machine controller as shown in FIG. 3. The flux voltage command signal may vary with time and the flux voltage command signal may be supplied to the controller for a predetermined amount of time. The flux voltage command signal may be a sine wave voltage or other periodic wave signal. The flux voltage may be input to an inverse Park and Clark transform to convert the flux voltage $V_d$ and the zero quadrature $V_q$ voltage in a rotating frame to phase voltages Van, Vbn, and Von as shown at blocks 311 and 312 of FIG. 3. The phase voltages may be converted to electrical pulses supplied to electric machine 126 via space vector pulse width modulation and power converter/inverter 134. Method 400 proceeds to 408.

At 408, method 400 judges whether or not injection of a time-varying flux voltage Va is to continue. If so, the answer is yes and method 400 proceeds to 406. If not, the answer is no and method 400 proceeds to 410. Method 400 may inject the time-varying flux voltage Va for a predetermined amount of time.

At 406, method 400 judges whether or not a high voltage is present at the invertor/power converter for the electric machine. The high voltage may be a voltage output of a traction battery. The high voltage may be present at the inverter/power converter when the vehicle is activated. Method 400 may also judge whether or not a torque command for the electric machine is zero or substantially zero (e.g., within 5 Nm of zero Nm). If method 400 judges that the high voltage is present and the torque command is zero or substantially zero, the answer is yes and method 400 proceeds to 404. Otherwise, the answer is no and method 400 proceeds to exit.

At 410, method 400 determines the quadrature current $i_q$ magnitude. An interior permanent magnet synchronous machine in a synchronous frame via the following equations:

$$V_d = R_s i_d + L_d \frac{di_d}{dt} - \omega_e L_q i_q \qquad (1)$$

$$V_q = R_s i_q + L_q \frac{di_q}{dt} + \omega_e(L_d i_d + \lambda_{pm}) \qquad (2)$$

where $R_s$ is phase winding resistance, $\lambda_{pm}$ is permanent magnet flux linkage, $L_d$ and $L_q$ are inductance at the d-q axis, $i_d$ and $i_q$ are current at the d-q axis, $V_d$ and $V_q$ are voltage at d-q axis, and $\omega_e$ electric machine rotor angular speed. When rotor rotational speed is zero ($\omega_e=0$), equations (1) and (2) may be simplified as:

$$v_d = R_s i_d + L_d \frac{di_d}{dt} \qquad (3)$$

$$v_q = R_s i_q + L_q \frac{di_q}{dt} \qquad (4)$$

A sinewave $v_d'$ voltage may be injected in the estimated synchronous frame as:

$$v_d' = V_0 * \sin(\omega t) \qquad (5)$$

$$v_q' = 0 \qquad (6)$$

where $\omega=2\pi f$ and f is the injection frequency for the injected flux voltage. The actual flux voltage $V_d$ and quadrature voltage $V_q$ may be determined by:

$$V_d = v_d' \cos\alpha = V_0 \cos\alpha * \sin(\omega t) \qquad (7)$$

$$V_q = V_0 \sin\alpha * \sin(\omega t) \qquad (8)$$

where $\alpha$ is the resolver offset error (e.g., the angle error of an angle between the electric machine rotor flux reference position and the electric machine position sensor zero angle reference position). Substitute equation (7) and (8) into eq. (3) and (4), the true flux current $i_d$ and quadrature current $i_q$ can be determined via:

$$i_d = \frac{v_0 \cos\alpha}{\sqrt{R_s^2 + \omega^2 L_d^2}} \sin(\omega t + \varphi_1) \qquad (9)$$

$$i_q = \frac{v_0 \sin\alpha}{\sqrt{R_s^2 + \omega^2 L_q^2}} \sin(\omega t + \varphi_2) \qquad (10)$$

where $\varphi_1=\text{atan}(\omega L_d/R_s)$ and $\varphi_2=\text{atan}(\omega L_q/R_s)$. Hence, the q-axis current (e.g., quadrature current) in the estimated synchronous frame can be determined via:

$$i_q' = -i_d \sin\alpha + i_q \cos\alpha = 0.5 V_0 \sin 2\alpha \left( \frac{\sin(\omega t + \varphi_2)}{\sqrt{R_s^2 + \omega^2 L_q^2}} - \frac{\sin(\omega t + \varphi_1)}{\sqrt{R_s^2 + \omega^2 L_d^2}} \right) \qquad (11)$$

For interior permanent magnet motors where $L_d \neq L_q$, $i_{q,mag}' = k V_0 |\sin 2\alpha|$.

Equation 11 shows that the magnitude of $i_q'=0$ if $\alpha=0$ such that the angle error=0, thereby indicating the predetermined angle between the electric machine rotor reference position and the electric machine rotor position sensor reference position exhibits no error. The value of $i_q'$ increases from zero to a maximum value as the angle error a increases from zero to 45 degrees. As such, the magnitude of $i_q'$ may be indicative of angle error between the electric machine rotor flux reference position and the electric machine rotor position sensor zero angle reference position. Method 400 proceeds to 412.

At 412, method 400 judges whether or not the estimated quadrature current is greater than a predetermined threshold quadrature current. If so, the answer is yes and method 400 proceeds to 414. Otherwise, the answer is no and method 400 proceeds to 416.

At 414, method 400 indicates degradation of the electric drive system. The degradation may be indicated via displaying a message to a human/machine interface or broadcasting a message to a cloud server. Method 400 proceeds to exit.

At 416, method 400 indicates no degradation of the electric drive system. The lack of degradation may be indicated via displaying a message to a human/machine interface or broadcasting a message to a cloud server. Method 400 may also operate the electric machine according to the angle between an electric machine rotor reference position and an electric machine position sensor reference position plus the angle error. The angle error may be estimated via a function that relates the magnitude of $i_q'$ to angle error. Method 400 proceeds to exit.

Thus, method 400 injects a time-varying flux voltage to an electric machine controller and estimates an electric machine position offset angle according to the the magnitude of $i_q'$ while torque request of the electric machine is zero.

The method of FIG. 4 provides for a method for operating an electric drive system, comprising: via a controller, supplying a time-varying flux voltage signal and zero quadrature voltage signal in synchronous frame to an electric machine controller that generates phase voltages for electric machine phase windings; and estimating an angle error for an angle between an electric machine rotor reference position and an electric machine position sensor reference position responsive to the time-varying flux voltage signal and zero quadrature voltage signal via the controller. In a first example, the method further comprises operating an electric machine via the electric machine controller based on the angle error between the electric machine rotor reference position and the electric machine position sensor reference position. In a second example that may include the first example, the method further comprises supplying the time-varying flux voltage signal and the zero quadrature voltage signal to an inverse Park and Clark transform. In a third example that may include one or both of the first and second examples, the method further comprises generating the phase voltages electric machine phase windings via the inverse Park and Clark transform. In a fourth example that may include one or more of the first through third examples, the method further comprises ceasing to supply the time-varying flux voltage signal in response to a torque command exceeding a threshold. In a fifth example that may include one or more of the first through fourth examples, the method further comprises operating a power inverter according to the time-varying flux voltage signal. In a sixth example that may include one or more of the first through fifth examples, the method further comprises determining an electric machine torque current (iq) generated from operating an inverter and an electric machine based on the time-varying flux voltage signal and zero quadrature voltage signal. In a seventh example that may include one or more of the first through sixth examples, the method further comprises indicating degradation of the electric machine in response to a magnitude of the electric machine torque current exceeding a threshold.

The method of FIG. 4 also provides for a method for operating an electric drive system, comprising: via a controller, while speed of an electric machine in the electric drive system is zero and while a torque request of the electric drive system to operate the electric machine is zero, starting to supply a time-varying flux voltage signal to an electric machine controller; continuously supplying the time-varying flux voltage signal to the electric machine controller for a predetermine duration so long as a predetermined voltage is present at the electric drive system and the torque request is zero; and estimating an error for an angle between an electric machine rotor reference position and an electric machine position sensor reference position responsive to the time-varying flux voltage signal via the controller. In a first example, the method further comprises operating the electric machine in response to the error. In a second example that may include the first example, the method further comprises determining an electric machine torque current based on the time varying flux voltage signal. In a third example that may include one or both of the first and second examples, the method includes where the error is based on the time-varying flux voltage signal and zero quadrature voltage signal. In a fourth example that may include one or more of the first through third examples, the method further comprises indicating degradation of the electric drive system in response to a torque current exceeding a threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an electric drive system, comprising:
   via a controller, supplying a time-varying flux voltage signal and zero quadrature voltage signal in synchronized frame to an electric machine controller that generates phase voltages for electric machine phase windings; and
   estimating an angle error for an angle between an electric machine rotor reference position and an electric machine position sensor reference position responsive to the time-varying flux voltage signal and zero quadrature voltage signal via the controller.

2. The method of claim 1, further comprising operating an electric machine via the electric machine controller based on the angle error between the electric machine rotor reference position and the electric machine position sensor reference position.

3. The method of claim 1, further comprising supplying the time-varying flux voltage signal and the zero quadrature voltage signal to an inverse Park and Clark transform.

4. The method of claim 3, further comprising generating the phase voltages electric machine phase windings via the inverse Park and Clark transform.

5. The method of claim 4, further comprising ceasing to supply the time-varying flux voltage signal in response to a torque command exceeding a threshold.

6. The method of claim 5, further comprising operating a power inverter according to the time-varying flux voltage signal.

7. The method of claim 1, further comprising determining an electric machine torque current (iq) generated from operating an inverter and an electric machine based on the time-varying flux voltage signal and zero quadrature voltage signal.

8. The method of claim 7, further comprising indicating degradation of the electric machine in response to a magnitude of the electric machine torque current exceeding a threshold.

9. A system, comprising:
   an electric drive system including an inverter and an electric machine; and
   a controller including executable instructions stored in non-transitory memory that cause the controller to:
      supply a time-varying flux voltage and zero quadrature voltage signal in synchronized frame to an electric machine controller that generates phase voltages for electric machine phase windings; and
      generate an estimated error of an angle between an electric machine rotor reference position and an electric machine position sensor reference position responsive to the time-varying flux voltage signal and zero quadrature voltage signal.

10. The system of claim 9, where the electric machine includes one or more permanent magnets, and where the estimated error of the angle between the electric machine rotor reference position and the electric machine position sensor reference position is determined when a rotational speed of the electric machine is zero.

11. The system of claim 10, further comprising commanding the electric drive system to generate the time-varying flux voltage signal while generating the estimate of offset angle error.

12. The system of claim 9, further comprising additional executable instructions to generate a flux current and torque current from the time-varying flux voltage signal and the zero quadrature voltage signal.

13. The system of claim 12, further comprising additional executable instructions to generate a flux voltage from the time-varying flux voltage signal.

14. The system of claim 13, further comprising additional executable instructions to determine a magnitude of a quadrature current, the quadrature current based on the time-varying flux voltage signal.

15. The system of claim 14, further comprising additional executable instructions to operate the electric machine in response to the estimated error of the angle.

16. A method for operating an electric drive system, comprising:

via a controller, while speed of an electric machine in the electric drive system is zero and while a torque request of the electric drive system to operate the electric machine is zero, starting to supply a time-varying flux voltage signal to an electric machine controller;

continuously supplying the time-varying flux voltage signal to the electric machine controller for a predetermine duration so long as a predetermined voltage is present at the electric drive system and the torque request is zero; and estimating an error for an angle between an electric machine rotor reference position and an electric machine position sensor reference position responsive to the time-varying flux voltage signal via the controller.

17. The method of claim 16, further comprising operating the electric machine in response to the error.

18. The method of claim 17, further comprising determining an electric machine torque current based on the time varying flux voltage signal.

19. The method of claim 18, where the error is based on the time-varying flux voltage signal and zero quadrature voltage signal.

20. The method of claim 16, further comprising indicating degradation of the electric drive system in response to a torque current exceeding a threshold.

\* \* \* \* \*